(12) United States Patent
Kristensen et al.

(10) Patent No.: US 10,499,662 B1
(45) Date of Patent: Dec. 10, 2019

(54) EXTRUDED PRODUCT POSITION CONTROL OF ICE CREAM PRODUCTS

(71) Applicant: Tetra Laval Holdings & Finance S.A., Pully (CH)

(72) Inventors: Poul Erik Kristensen, Lake Geneva, WI (US); Shane McBride, Decatur, IN (US)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 16/040,607

(22) Filed: Jul. 20, 2018

(51) Int. Cl.
| | |
|---|---|
| A23G 9/04 | (2006.01) |
| A23G 7/00 | (2006.01) |
| A23G 9/48 | (2006.01) |
| G01B 11/02 | (2006.01) |
| G01B 11/06 | (2006.01) |
| A23G 9/50 | (2006.01) |

(52) U.S. Cl.
CPC .............. *A23G 7/0037* (2013.01); *A23G 9/48* (2013.01); *A23G 9/503* (2013.01); *G01B 11/028* (2013.01); *G01B 11/0608* (2013.01)

(58) Field of Classification Search
CPC ...... A23G 9/285; A23G 9/286; B65B 25/007; G01B 11/04; G01B 11/0608; G01B 11/2522; G01B 11/0691
USPC .............. 356/614–635; 250/223 R, 559.12, 250/559.29, 559.4; 426/231–232; 425/312, 308, 315, 114
See application file for complete search history.

(56) References Cited

U.S. PATENT DOCUMENTS

| | | | | |
|---|---|---|---|---|
| 3,822,623 | A * | 7/1974 | Wight | A23G 3/0247 83/171 |
| 4,989,720 | A * | 2/1991 | Price | A23G 9/286 198/430 |
| 8,259,308 | B2 * | 9/2012 | Bishop | A21B 1/48 219/492 |
| 2012/0314222 | A1 * | 12/2012 | Stone | B07C 5/04 356/601 |

* cited by examiner

*Primary Examiner* — Hoa Q Pham
(74) *Attorney, Agent, or Firm* — Renner, Otto, Boisselle & Sklar, LLP

(57) ABSTRACT

A method and system of producing extruded ice cream products includes providing a plurality of extruded ice cream products in an ordered arrangement on a plurality of trays and arranging the plurality of trays for movement along a conveyor line. The plurality of trays and the plurality of extruded ice cream products are arranged thereon for downstream processing. The method and system further includes sensing at least one of a vertical product height or a horizontal product position of the plurality of extruded ice cream products arranged on the plurality of trays using at least one sensor, and analyzing the sensed at least one of the vertical product height or the horizontal product position of the plurality of extruded ice cream products using a processor to determine suitability for downstream processing.

14 Claims, 11 Drawing Sheets

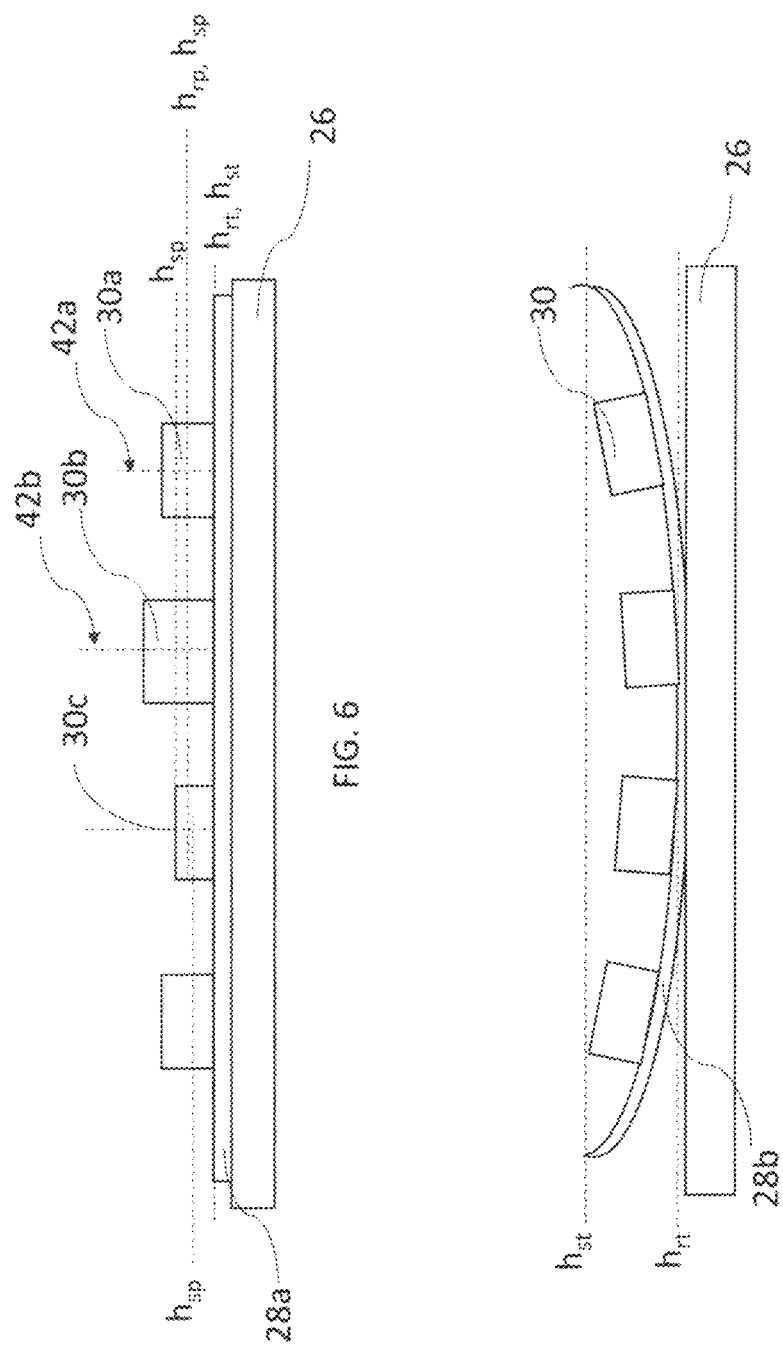

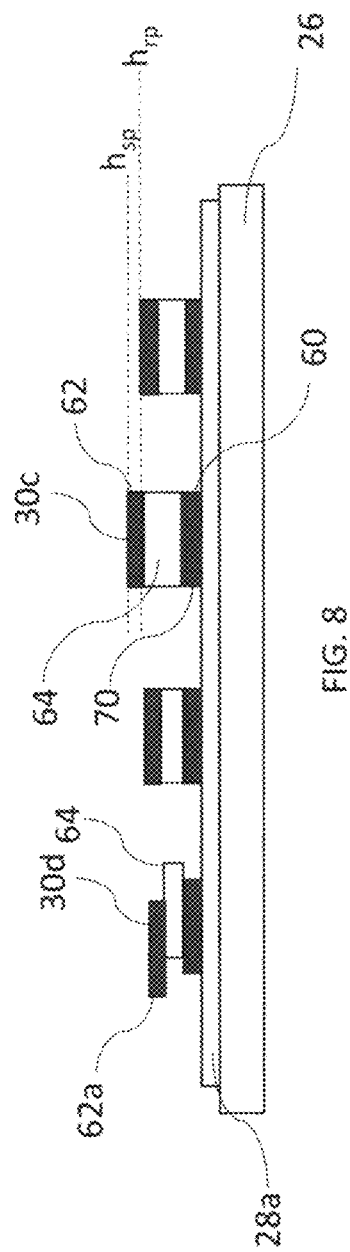

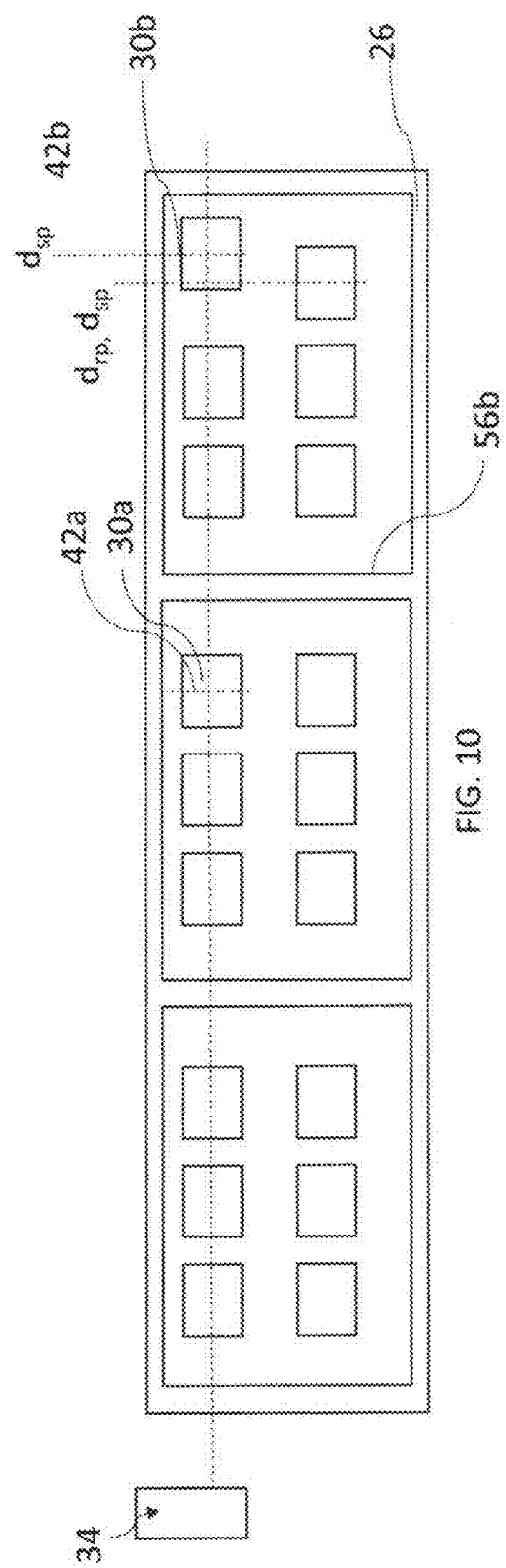

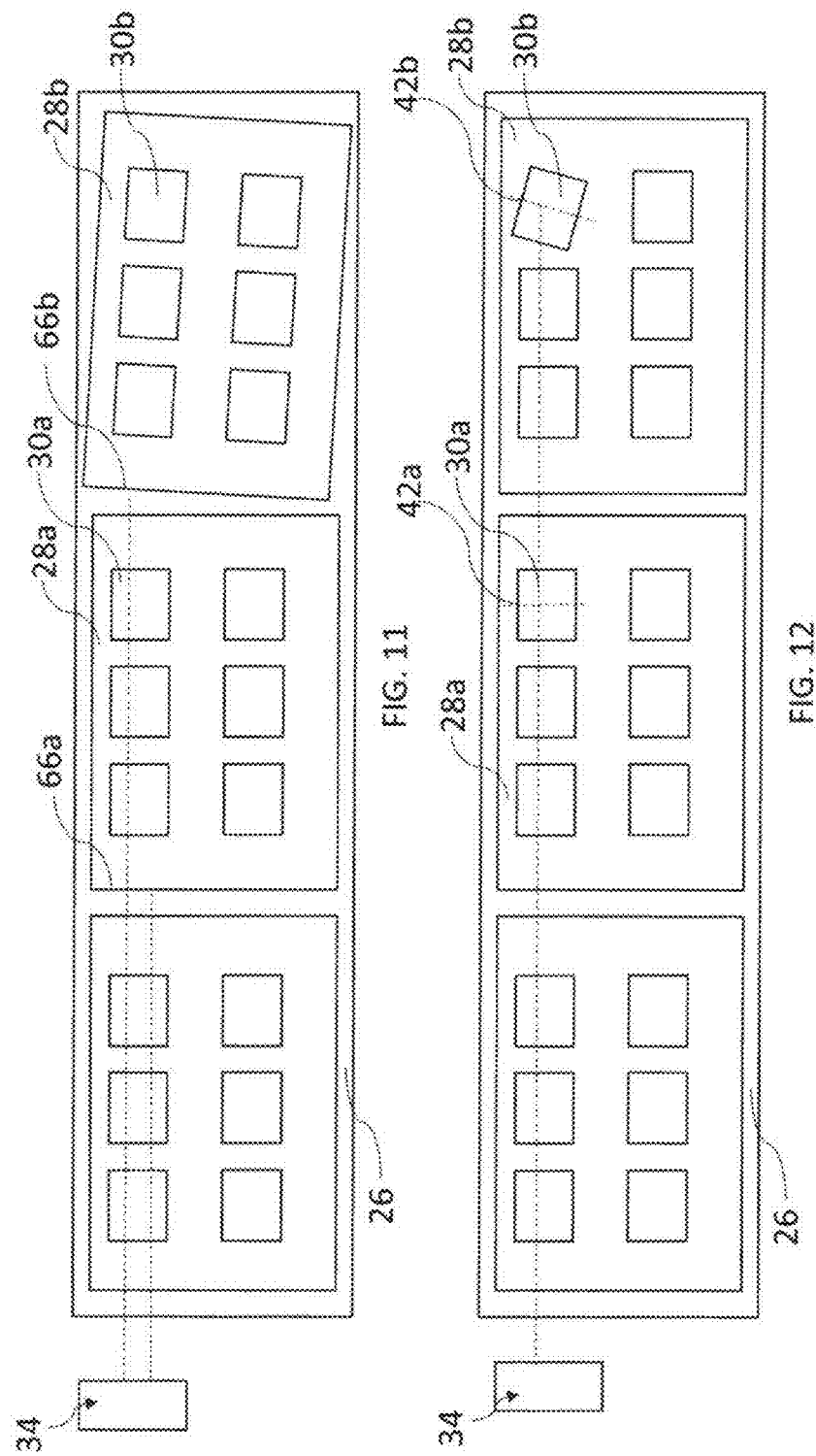

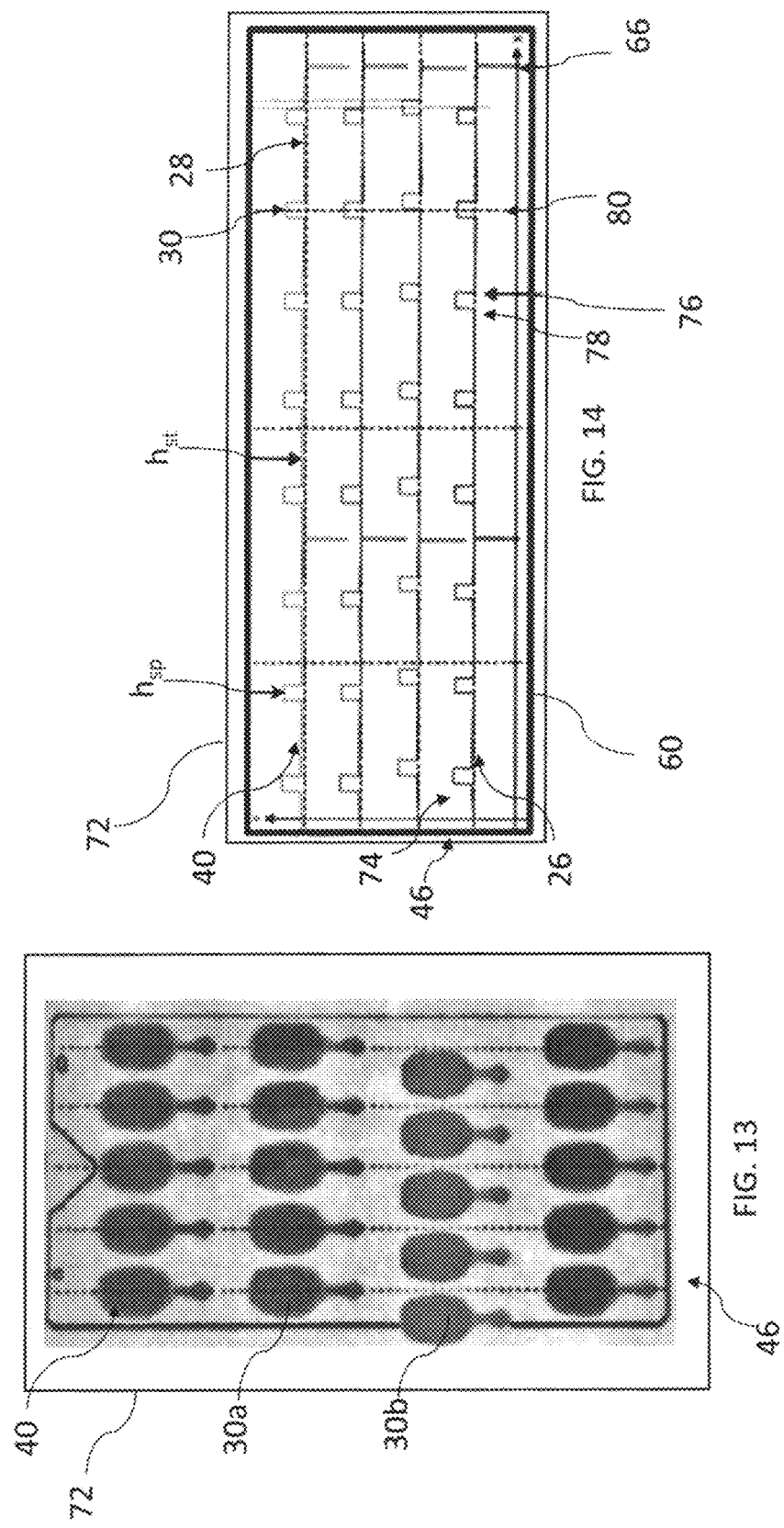

EXTRUDED PRODUCT POSITION CONTROL OF ICE CREAM PRODUCTS

TECHNICAL FIELD

The present invention relates to a method and system for producing extruded ice cream products, and in particular to a method and system for determining a misalignment of an extruded ice cream product that would result in a downstream machine's being unable to perform a post-processing on the misaligned extruded ice cream product.

TECHNICAL BACKGROUND

Conventional extruded ice cream products, such as ice cream bars having sticks and ice cream sandwiches, are automatically processed using a conveyor-type production line. Each extruded ice cream product is moved along a conveyor line, or belt, for processing of the product at different locations or stations. Multiple products are placed on the conveyor line and arranged in ordered columns and rows to be received for post-processing by downstream processing machines. The products may be arranged on trays placed along the conveyor line. Proper alignment of the tray relative to the conveyor line, and proper alignment of the ice cream products relative to the tray, or to the conveyor line, must be ensured along the length of the conveyor line. The proper alignment of the products enables each extruded ice cream product to be processed at the downstream station.

The downstream station requires proper alignment of the extruded ice cream products so that the post-processing machine is able to engage or pick up the products. For example, the machine may pick up the product by the stick if the product is an extruded ice cream bar having a stick. Improper alignment of the tray or the product will result in the post-processing machine failing to pick up the misaligned product, and the product will be discarded as waste. The tray containing the extruded ice cream products may also be misaligned or bent, such that the height of each extruded ice cream product will be different relative to the height at which the post-processing machine is configured to engage the products. The amount of misalignment is directly proportional to the number of products that are discarded, such that if the entire tray is substantially misaligned due to at least one of a horizontal displacement or vertical displacement, all of the products on the tray will most likely have to be discarded.

Current extruded ice cream production lines rely on the manual judgement of a product line operator. The operator visually inspects the extruded ice cream product positions during the continuous movement of the trays and products, and the detected misaligned products may be re-aligned before reaching the post-processing machine. However, manually inspecting the product positions may be burdensome to the operator. Additionally, manual inspection may be subjective as different operators will have different judgment regarding the displacements of the products. Moreover, manual inspection may result in misaligned trays and products being frequently undetected, and subsequently, large quantities of wasted extruded ice cream products.

SUMMARY OF THE INVENTION

The present invention, and the embodiments thereof, aims at providing an improved method and system for producing extruded ice cream products. The extruded ice cream production process includes an automatic method and system for sensing vertical and horizontal positions of a plurality of extruded ice cream products arranged on a tray along a conveyor line. The automatic method and system may also sense the positions of the tray relative to the conveyor line, and the positions of the extruded ice cream products relative to the tray. The automatic method and system uses at least one sensor, such as a laser sensor or a machine vision camera, to sense the positions of the extruded ice cream products and the trays. The sensor is in communication with a processor which is used to compare the sensed data to stored reference data pertaining to positions that enable the extruded ice cream products to be post-processed. In an extruded ice cream stick product, sensing the positions of the products may include sensing the positions of the sticks. In an extruded ice cream sandwich product, sensing the positions of the products may include sensing the edge positions of the biscuits that encompass the ice cream layer.

The extruded ice cream products and the trays are deemed suitable for downstream processing if a deviation between the sensed positions and the reference positions is less than a predetermined deviation. The positions may be continuously output to a production line operator in several formats, including product graphics that represent the real-time positions of the products and trending graphics that representatively show how different lanes of the products have been operating over a period of time with regards to the positions of the products in the lanes. The positions may correspond to positions of the sticks of the products. The output may further include visual indicators that represent directions in which a misplaced product or stick must be moved for downstream processing, and an automatic function that automatically corrects the positions of the products on the tray without operator interaction.

The positions may be continuously output to a production line operator as a pulse-shaped signal having a shape that is proportional to at least one of the sensed vertical heights and the sensed horizontal positions. The method and system for producing extruded ice cream products enables more effective sensing of product misalignment such that more misaligned products may be sensed and re-aligned before post-processing, resulting in less waste of extruded ice cream products. The method and system enables sensing of multiple misalignment scenarios including horizontal displacements of the trays or the products, and vertical displacements of the trays or the products.

According to an aspect of the invention, a method of producing extruded ice cream products includes providing a plurality of extruded ice cream products in an ordered arrangement on a plurality of trays and arranging the plurality of trays for movement along a conveyor line. The plurality of trays and the plurality of extruded ice cream products are arranged on the conveyor line for downstream processing. The method further includes sensing at least one of a vertical product height or a horizontal product position of the plurality of extruded ice cream products arranged on the plurality of trays using at least one sensor, and analyzing the sensed at least one of the vertical product height or the horizontal product position of the plurality of extruded ice cream products using a processor to determine suitability for downstream processing.

According to an embodiment of any paragraph(s) of this summary, the method includes using at least one laser sensor or machine vision camera arranged over at least one lane of the plurality of extruded ice cream products that extends along the conveyor line in a direction of movement of the conveyor line.

According to an embodiment of any paragraph(s) of this summary, the method includes using a plurality of aligned laser sensors that each correspond to one of a plurality of lanes.

According to an embodiment of any paragraph(s) of this summary, the method includes using a single laser sensor and a plurality of directing optical devices that are each in communication between the single laser sensor and a corresponding one of a plurality of lanes.

According to an embodiment of any paragraph(s) of this summary, the method includes outputting the sensed at least one of the vertical product height or the horizontal product position of the plurality of extruded ice cream products as a plurality of pulse-shaped signals having a shape that is proportional to the sensed vertical product height or horizontal product position.

According to an embodiment of any paragraph(s) of this summary, the method includes continuously sensing the at least one of the vertical product height or the horizontal product position of the plurality of extruded ice cream products.

According to an embodiment of any paragraph(s) of this summary, the method includes comparing the sensed at least one of the vertical product height or the horizontal product position of the plurality of extruded ice cream products to a reference vertical product height or a reference horizontal product position of the plurality of extruded ice cream products, respectively, using the processor to calculate a vertical product height deviation or a horizontal product position deviation. The processor determines the plurality of extruded ice cream products are suitable for downstream processing when the calculated deviation is less than a predetermined deviation.

According to an embodiment of any paragraph(s) of this summary, the method includes sensing the at least one of a vertical product height or the horizontal product position by sensing a vertical position or horizontal position of sticks that are centrally arranged in the plurality of extruded ice cream products.

According to an embodiment of any paragraph(s) of this summary, the method includes sensing at least one of a vertical product height or a horizontal product position of bottom biscuits of the plurality of extruded ice cream products using the at least one sensor, and sensing at least one of a vertical product height or a horizontal product position of top biscuits of the plurality of extruded ice cream products using the at least one sensor.

According to an embodiment of any paragraph(s) of this summary, the method includes sensing at least one of a vertical tray height or a horizontal tray position of the plurality of trays using the at least one sensor, and analyzing the sensed at least one of the vertical tray height or the horizontal tray position of the plurality of trays using the processor to determine suitability for downstream processing.

According to an embodiment of any paragraph(s) of this summary, the method includes sensing the horizontal tray position of edges of the plurality of trays using the at least one sensor, and sensing the horizontal product position of the plurality of extruded ice cream products relative to the edges of the plurality of trays using the at least one sensor.

According to an embodiment of any paragraph(s) of this summary, the method includes comparing the sensed at least one of the vertical tray height or the horizontal tray position of the plurality of extruded ice cream products to a reference vertical tray height or a reference horizontal tray position of the plurality of trays, respectively, using the processor to calculate a vertical product tray deviation or a horizontal tray deviation. The processor determines that the plurality of extruded ice cream products arranged on the plurality of trays are suitable for downstream processing when the calculated deviation is less than a predetermined deviation.

According to another aspect of the invention, a system for producing extruded ice cream products, includes a plurality of extruded ice cream products having an ordered arrangement on a plurality of trays that are arranged for movement along a conveyor line for downstream processing, at least one sensor that is configured to sense at least one of a vertical product height or a horizontal product position of the plurality of extruded ice cream products arranged on the plurality of trays, and a processor that is configured to analyze the sensed at least one of the vertical product height or the horizontal product position of the plurality of extruded ice cream products to determine suitability for downstream processing.

According to an embodiment of any paragraph(s) of this summary, the system includes the at least one sensor being configured to sense at least one of a vertical tray height or a horizontal tray position of the plurality of trays, and the horizontal product position of the plurality of extruded ice cream products relative to the plurality of trays, and the processor being configured to analyze the sensed at least one of the vertical tray height or the horizontal tray position of the plurality of trays to determine suitability for downstream processing.

According to an embodiment of any paragraph(s) of this summary, the system includes the plurality of extruded ice cream products having sticks that are centrally arranged in the extruded ice cream products and the vertical product height or the horizontal product position corresponds to a vertical height or a horizontal position of the sticks. Alternatively, the extruded ice cream products have a bottom biscuit, a top biscuit, and an ice cream layer extruded therebetween, and the vertical product height or the horizontal product position corresponds to a vertical height or a horizontal position of at least one of the bottom biscuit and the top biscuit.

Although various aspects of the invention are set out in the accompanying independent claims, other aspects of the invention may include any combination of features from the described embodiments and/or the accompanying dependent claims with the features of the independent claims, and not only the combinations explicitly set out in the accompanying claims.

BRIEF DESCRIPTION OF THE DRAWINGS

FIG. 6 is a schematic drawing showing a front view of a straight tray containing extruded ice cream products that have a deviation in vertical height from a reference height.

FIG. 7 is a schematic drawing showing a front view of a bent tray containing extruded ice cream products that have a deviation in vertical height from a reference height.

FIG. 8 is a schematic drawing showing a front view of a straight tray containing an ice cream sandwich that has a deviation in vertical height from a reference height.

FIG. 10 is a schematic drawing showing a top view of the conveyor line having a misaligned extruded ice cream product.

FIG. 11 is a schematic drawing showing a top view of the conveyor line having an angularly displaced tray.

FIG. 12 is a schematic drawing showing a top view of the conveyor line having an angularly displaced extruded ice cream product.

FIG. 13 is a schematic drawing showing an output of the system shown in FIG. 1.

FIG. 14 is a schematic drawing showing another output of the system shown in FIG. 1.

DETAILED DESCRIPTION OF EMBODIMENTS

The method and system according to the present invention has particular application in the production of extruded ice cream products, such as ice cream bars having a stick or ice cream sandwiches. The production lines for other frozen ice cream products, such as stick novelties, bar products, cakes, or candy bars may also be suitable applications. Many other applications may be suitable. The method and system uses at least one sensor, such as a laser sensor or a machine vision camera, to continuously monitor the positions of the extruded ice cream products as the products are moved along a conveyor line for processing. The automatic method and system includes a processor that receives data pertaining to the positions and determines whether any of the extruded ice cream products are misaligned and unsuitable for downstream processing. Thus, the method and system automatically provides reliable position control of the extruded ice cream products, in contrast to the manual inspection methods that are currently implemented in extruded ice cream production lines.

Figure 1:
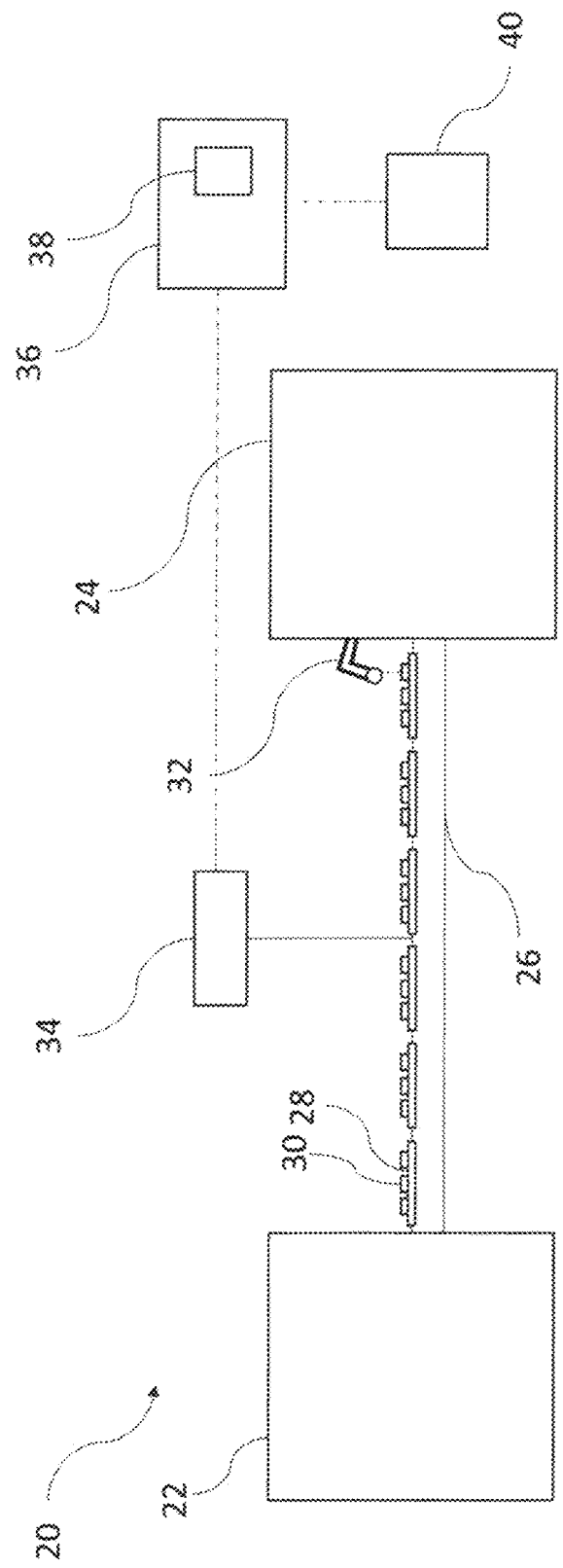
FIG. 1 is a schematic drawing of a system for producing extruded ice cream products in accordance with an embodiment of the present invention.

Referring first to FIG. 1, an extruded ice cream product producing system 20 is schematically shown. The system 20 includes a bar-making machine 22, a post-processing machine 24, and a conveyor belt or line 26 that moves a plurality of trays 28 and extruded ice cream products 30 arranged on the trays 28 from the bar-making machine 22 to the post-processing machine 24. The bar-making machine 22 includes an extruder that shapes and cuts low temperature ice cream into the extruded ice cream products 30. The post-processing machine 24 may include at least one automatic device or robotic arm 32 that engages each extruded ice cream product 30 for post-processing. Any suitable post-processing may be performed by the post-processing machine 24. Examples of suitable post-processing includes stamping, loosening, decorating, coating, wrapping, packaging, hardening, filling, and the extruded ice cream products 30. The robotic arm 32 may remove the ice cream product 30 off the tray 28 for post-processing.

The extruded ice cream producing system 20 advantageously includes a sensor feedback system, or a position sensing system 34 that is arranged at a location over the conveyor line 26 that enables the optical position sensing system 34 to sense both vertical and horizontal positions of the extruded ice cream products 30 and the trays 28. The optical position sensing system 34 is configured to continuously monitor and sense the horizontal and vertical positions along the conveyor line 26. The optical position sensing system 34 is in communication with a processor 36 that is configured to receive the sensed position data from the optical position sensing system 34. The processor 36 may comprise any suitable electronic control mechanism, such as a central processing unit (CPU), microprocessor, control circuitry, and the like. The processor 36 also includes a memory 38 in which reference position data is stored for comparison with the sensed position data. The processor 36 is also configured to provide an output 40 that schematically or graphically shows the sensed positions of the trays 28 and the extruded ice cream products 30 in real time.

The output 40 may include a graphical user interface (GUI) that is operable by an operator of the production line. The GUI may include indicators that are viewable by the operator and represent corrections of the misaligned ice cream products 30 that are necessary to align the ice cream products 30 with the reference position. On the GUI, the operator may be able to select a manual or automatic correction mode. If a manual mode is selected, the operator can manually correct the position of the ice cream products 30 based on the graphically shown product positions and figures of the GUI. The reference positions and the actual positions of the ice cream products 30 are displayed on the GUI by the processor 36. If an automatic mode is selected, the processor 36 will continue to regulate the ice cream products 30. The processor 36 will automatically correct the position of the ice cream products 30 and maintain the ice cream products 30 in the reference position relative to the trays 28. The automatic correction may be performed by any suitable controller.

Figure 2:
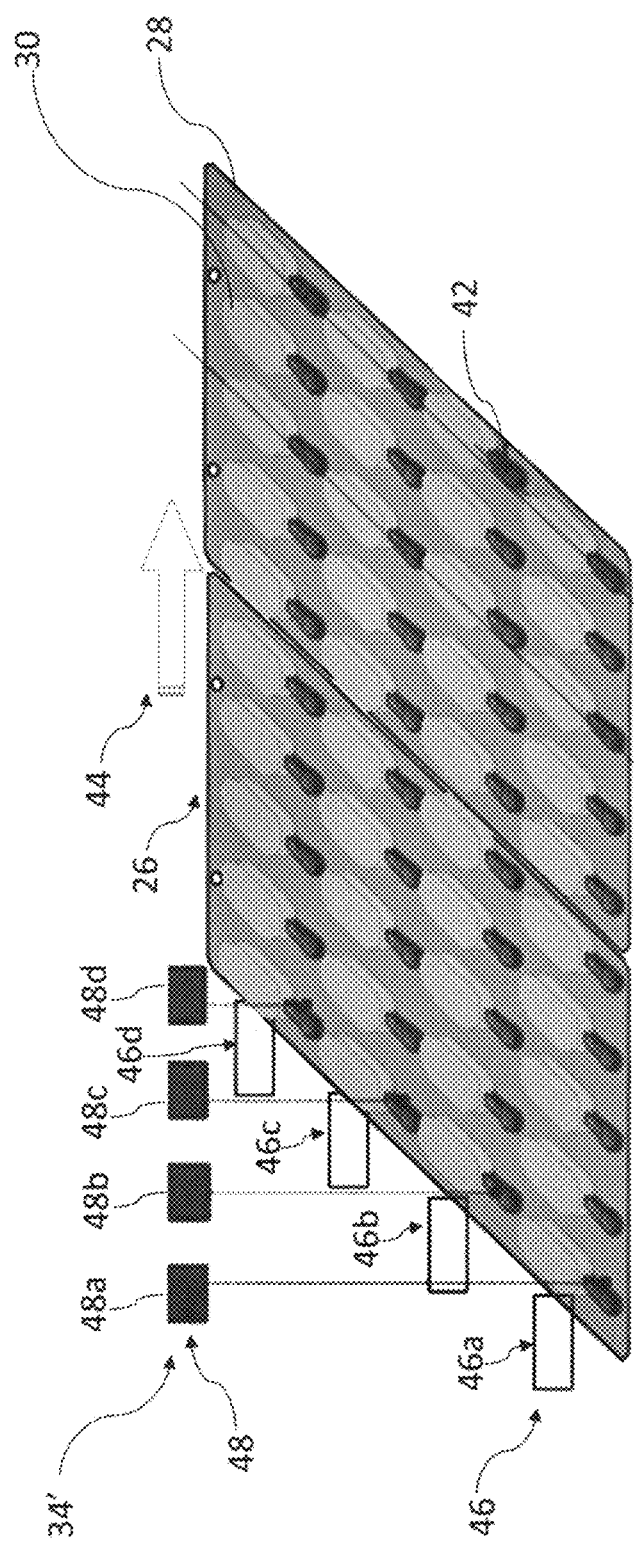
FIG. 2 is a schematic drawing showing position sensors of the system shown in FIG. 1 according to an embodiment of the present invention.
Figure 3:
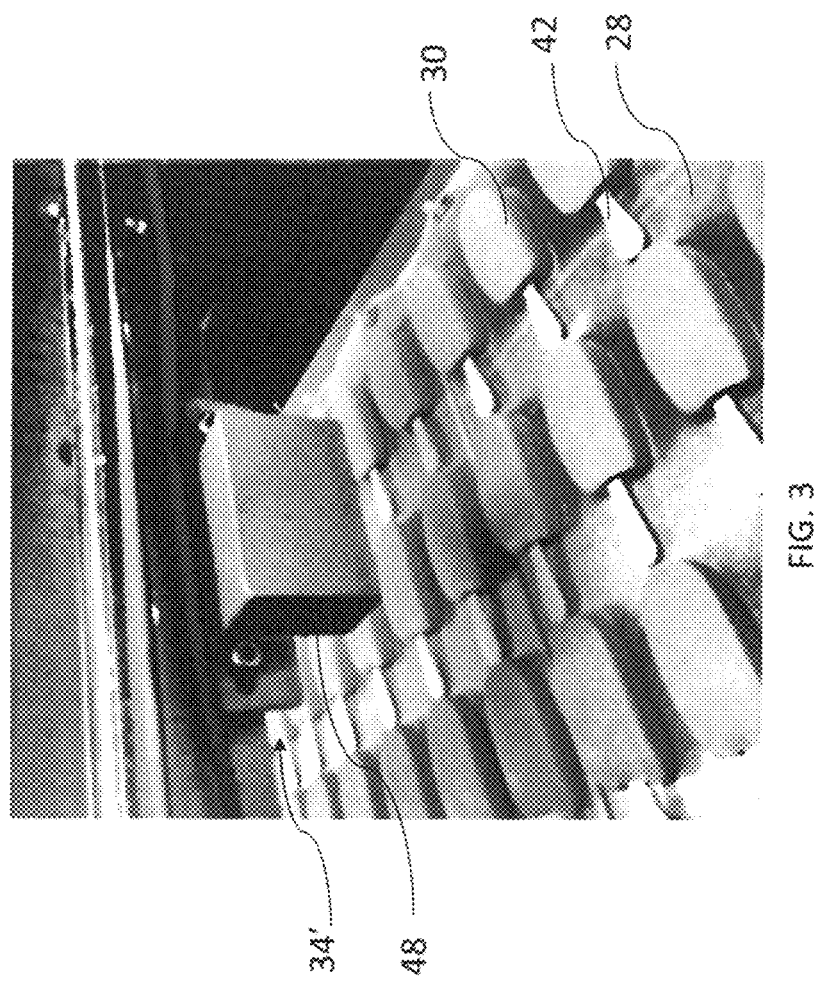
FIG. 3 is a schematic drawing showing a detailed view of the system shown in FIG. 2.

Referring now to FIGS. 2 and 3, an exemplary embodiment of the optical position sensing system is schematically shown. The optical position sensing system 34' is configured to sense the horizontal and vertical positions of the extruded ice cream products 30 that are formed as ice cream bars having centrally arranged sticks 42. Each stick 42 is elongated along the width of the conveyor line 26 and extends from outside the extruded ice cream bar into the extruded ice cream bar to at least a middle location along the length of the extruded ice cream bar. The extruded ice cream is shaped in an extrusion nozzle where a stick may be inserted into the ice cream shortly before the ice cream leaves the nozzle. A cutter device cuts through the ice cream at a predetermined time when the height of the cutter device is equal to the height of the ice cream bar. As the cutter device separate the ice cream from the extrusion nozzle, the ice cream product falls onto the product trays from the device.

The width of the ice cream bar is parallel to the width of the stick 42. The extruded ice cream bar may have any suitable shape and the shape of each of the extruded ice cream bars is substantially the same. Examples of suitable shapes include rectangular, elliptical, cylindrical and cylindrical. Many other shapes may be suitable.

The extruded ice cream products 30 are positioned in an ordered arrangement along the lengths and the widths of the trays 28, and the extruded ice cream products 30 are spaced relative to each other. The ice cream products 30 and the sticks 42 must be spaced at a predetermined distance to prevent the products 30 from merging and sticking together. The trays 28 are arranged adjacent to each other to maintain a distance between the extruded ice cream products 30 of adjacent trays 28 that is equal to a distance between the extruded ice cream products 30 arranged on the same tray 28. When the extruded ice cream products 30 are all properly aligned, the lengths of the sticks 42 will extend along a common axis that is perpendicular to a movement direction 44 of the conveyor line 26. Each tray 28 contains the same number of extruded ice cream products 30 and the trays 28 may have a width across the conveyor line 26 that is greater than the length of the tray 28. In alternative embodiments, the ice cream products 30 may be oppositely arranged such that the length of the ice cream products 30 extends in a direction that is parallel to the movement direction 44 of the conveyor line 26.

The conveyor line 26 includes a plurality of lanes 46, 46a, 46b, 46c, 46d that each extend in a direction that is parallel to the movement direction 44. The common axis of the sticks 42 will extend across the plurality of lanes 46a, 46b, 46c, 46d. Each lane 46 extends across multiple trays 28. The lanes 46a, 46b, 46c, 46d are parallel to each other and all of the extruded ice cream products 30 are arranged in one of the lane 46a, 46b, 46c, 46d. Any suitable number of lanes 46 may be provided. For example, four lanes 46a, 46b, 46c, 46d may be suitable and each lane 46a, 46b, 46c, 46d may have five extruded ice cream products 30 per tray 28, as shown in FIG. 2. Any suitable number of ice cream products may be arranged in the lane 46 so long as each lane 46 has an equal number of ice cream products. The position sensing system 34' is arranged vertically above the conveyor line 26 and the lanes 46a, 46b, 46c, 46d. The position sensing system 34' includes a plurality of sensors 48, 48a, 48b, 48c, 48d that correspond to the plurality of lanes 46, 46a, 46b, 46c, 46d, respectively, such that each lane 46 has a sensor 48 that continuously senses the horizontal and vertical positions of an extruded ice cream product 30 or a stick 42 of the ice cream product 30 moving along the lane 46.

The sensors 48a, 48b, 48c, 48d may be any suitable type of optical sensors, such as laser sensors. The laser sensors provide outputs that represent the distance from the laser to the object of the laser, such as the sensed tray 28, a sensed stick 42 or extruded ice cream product 30. Thus, changes in the output of the laser sensor represent a change at least one of the vertical heights or the horizontal positions of the trays 28 or the extruded ice cream products 30. For example, during the sensing of the vertical heights of the trays 28 and the extruded ice cream products 30, when the output of the laser incurs a leading edge of a tray 28, the output of the laser sensor will reflect the relative vertical height of the tray 28 relative to the conveyor line 26. Upon encountering a leading edge or a stick 42 of the extruded ice cream product 30 to be sensed, the output of the laser sensor changes to reflect the relative change in height, or the distance between the height of the ice cream product 30 or the stick 42 and the tray 28, such that the height of the ice cream product 30 relative to the conveyor line 26 is also known. In between the ice cream products 30 arranged on the tray 28, the laser sensor will produce an output indicative of the vertical height of the tray 28. If the tray 28 is bent or warped and has a displaced vertical height, the laser sensor will produce an output indicative of the corresponding vertical height due to the displacement at the sensed area of the tray 28.

The laser sensors may be arranged in a linear array that extends over the width of the conveyor line 26 for the horizontal position sensing of the trays 28 and the extruded ice cream products 30. The laser sensor will produce outputs indicative of edges of the trays 28 and the edges or sticks 42 of the ice cream products 30. The laser sensor may be configured to scan the width of the conveyor line 26 to sense changes in the horizontal positions. In alternative embodiments, the laser sensor may be configured to move along the width of the conveyor line 26. The outputs of the laser sensor are processed by the processor 36 which generates an output 40 (shown in FIG. 1) pertaining to the sensed data. The output may be a plurality of pulse-shaped signals having shapes that corresponds to the sensed vertical heights and horizontal positions as sensed along each lane. The plurality of pulse-shaped signals may be graphically represented in real-time, and the changes in positions may be reflected by sharp edges or peaks in the plurality of pulse-shaped signals that are readily identifiable by an operator looking at the graphical representation. The output may be represented as actual position figures on a display that reflect the actual positions of the ice cream products relative to the trays 28

Sensing the horizontal and vertical positions using the distances between the laser sensors and the trays 28 or the extruded ice cream products 30, and the detection of edges of the object, is advantageous compared with manual inspection. Manual inspection is disadvantageous because the conveyor line 26 may stretch over time and the objects may not appear to be displaced relative to the conveyor line 26 such that a visual inspection may render a tray or product suitable for downstream processing. However, the trays 28 on the conveyor line 26 may be warped, causing a displacement of the products 30 as the actual vertical position of the ice cream products 30 may be outside a predetermined acceptable deviation that would prevent downstream processing of the ice cream products. Using the distance between the laser sensor and the trays 28 and the extruded ice cream products 30 accommodates for any deviation in vertical position relative to the laser sensor, rather than to the conveyor line 26. The ice cream products may also be displaced horizontally outside of a predetermined acceptable deviation on the trays 28 in a direction that is parallel to the conveyor line 26. Such displacements would also prevent downstream processing. Using the laser sensor to detect the position of the ice cream products 30 relative to the positions of the trays 28 accommodates for any deviations in the horizontal positions.

Figure 4:
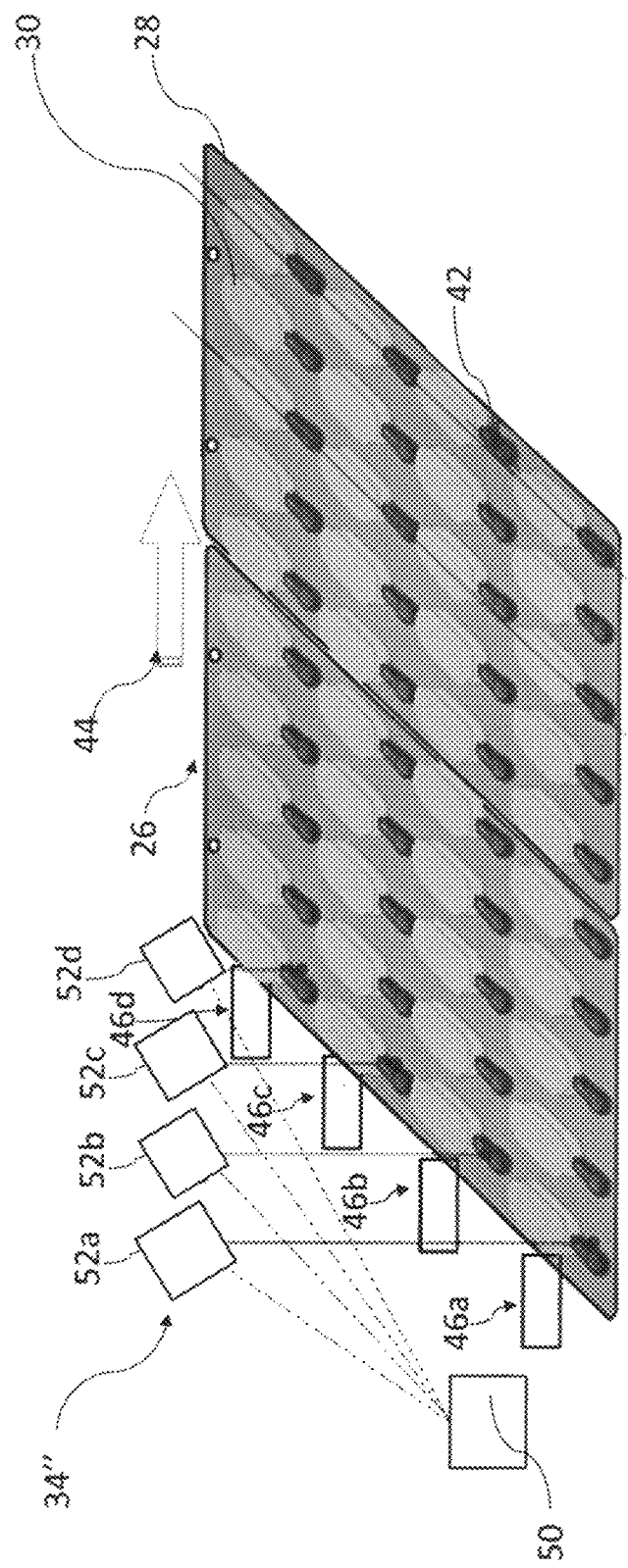
FIG. 4 is a schematic drawing showing a position sensor of the system shown in FIG. 1 according to a second embodiment of the present invention.
Figure 5:
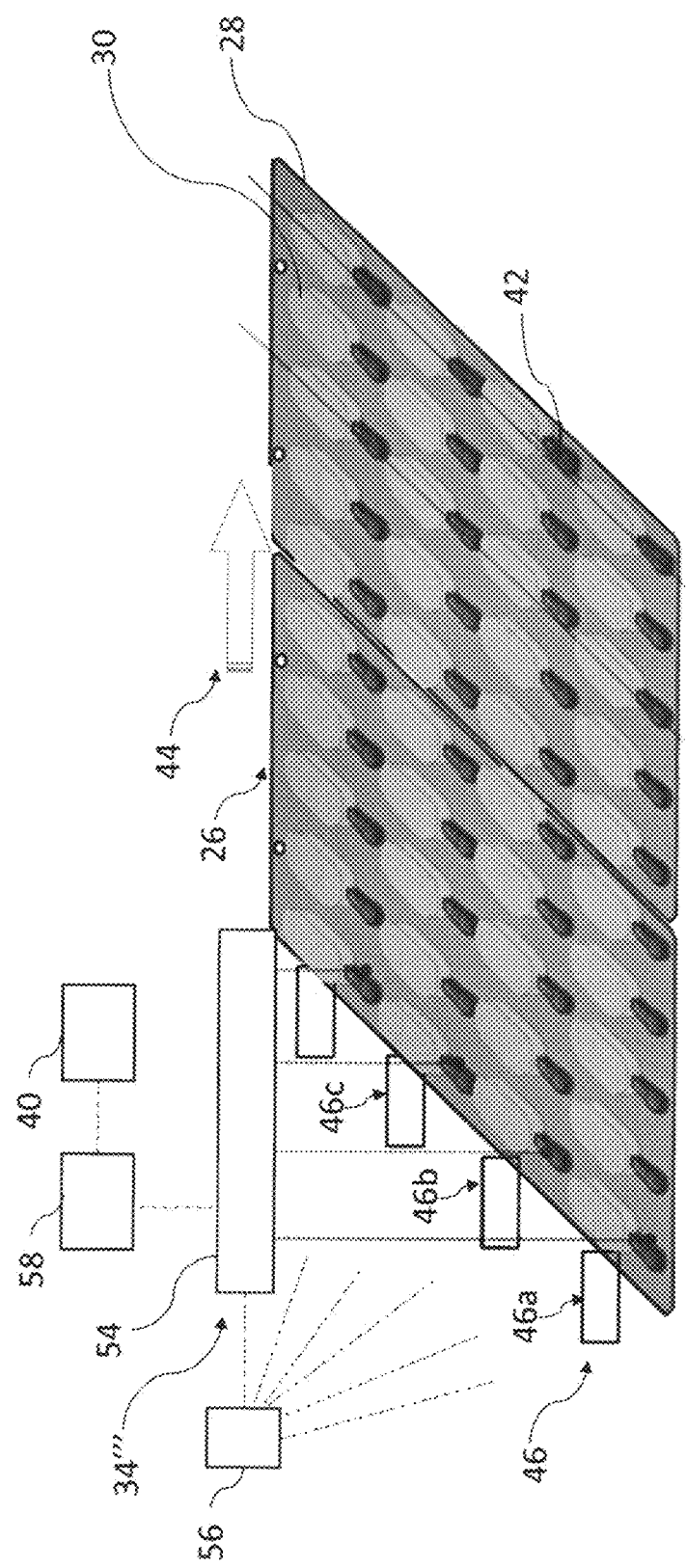
FIG. 5 is a schematic drawing showing a position sensor of the system shown in FIG. 1 according to a third embodiment of the present invention.

The position sensing system may have alternative embodiments, as schematically shown in FIGS. 4 and 5. FIG. 4 shows a second exemplary embodiment of the optical position sensing system 34" in which the optical position sensing system 34" includes a single sensor 50 that is arranged over the trays 28 at a location offset from the plurality of lanes 46a, 46b, 46c, 46d in which the extruded ice cream products 30 are arranged. The single sensor 50, which may be a laser sensor, is in alternating communication with a plurality of optical directing devices 52a, 52b, 52c, 52d that correspond to the plurality of lanes 46a, 46b, 46c, 46d. The optical directing devices 52a, 52b, 52c, 52d are arranged perpendicular to the movement direction 44 of the conveyor line 26 and angled relative to the trays 28. Accordingly, the single sensor 50 directs a laser beam towards the respective optical directing devices 52a, 52b, 52c, 52d and detects the horizontal and vertical positions of the ice cream products 30 through the optical directing devices 52a, 52b, 52c, 52d. Any suitable optical directing device may be used and an example of a suitable optical directing device is a mirror.

FIG. 5 shows a third exemplary embodiment of the optical position sensing system 34''' in which the in which the optical position sensing system 34''' includes a machine vision camera that is arranged above and over the plurality of lanes 46, 46a, 46b, 46c, 46d to sense the horizontal and vertical positions. The machine vision camera includes a camera 54, a light source 56, and an analog/digital conversion module 58. The light source 56 illuminates the lanes 46, 46a, 46b, 46c, 46d, the camera 54 senses the position of at least one of the extruded ice cream products 30 and the trays 28, and the analog/digital conversion module 58 converts the sensed data into a processed digital image that may be generated as the output 40. The analog/digital conversion module 58 may be part of the processor 36 or in communication with the processor 36. The horizontal and vertical positions may be determined using one or more cameras with distance estimating capability as are known. Alternatively, or additionally, at least one additional camera may be mounted adjacent the conveyor line 26 such that the trays 28 are imaged from a side of the tray 28 to provide vertical height data using conventional image analysis.

Any of the above sensor embodiments may include sensors that are configured to only detect the positions of the extruded ice cream product 30 or stick 42 of the extruded ice cream product 30 when the extruded ice cream product 30 or stick 42 is located directly below the sensor, or at a predetermined area below the sensor, as schematically shown in FIGS. 2, 4, and 5. In further alternative embodiments, the sensors may be light-emitting diode sensors or any other sensors that are configured to sense raw data indicative of at least one of the horizontal positions and the vertical positions of the trays 28 and the extruded ice cream products 30. The sensors are suitable for optical detection in the cold operating temperatures of the ice cream production line. For example, the sensors are operable in temperatures between −5° Celsius and −15° Celsius, or similar temperatures at which the extrusion of the ice cream products occurs. A heat sensing device and heater may be provided to maintain a particular operating temperature of the sensors. The sensors are capable of sensing the positions of any suitable number of products per hour and the sensing may be dependent on the output of the upstream machine. In exemplary applications, the sensors may sense the positions of up to 30 trays per minute. In other exemplary applications, the sensors may sense the positions of up to 25,000 extruded ice cream products per hour. In still other exemplary applications, the sensor may sense the positions of up to 44,000 extruded ice cream products per hour.

Referring now to FIGS. 6-11, schematic drawings pertaining to some of the different potential displacements of the trays 28 and the extruded ice cream products 30 during operation of the extruded ice cream production line are shown. The displacements are determined relative to reference positions that are initially sensed by the position sensing system 34. The reference positions may correspond to any horizontal position of the trays 28 and the extruded ice cream products 30. Referring first to FIGS. 6 and 7, the position sensing system 34 initially senses a reference vertical position of at least one of a tray 28 and an extruded ice cream product 30 that have a height enabling the ice cream product 30 to be suitable for downstream processing. FIGS. 6 and 7 schematically show a front view of a sensed tray 28a, 28b. As shown in FIG. 6, the reference tray 28a is straight and has no vertical displacement or bend relative to the conveyor line 26. When the sensed vertical tray height $h_{st}$ is sensed by the position sensing system and the processor 36 (shown in FIG. 1) compares the sensed vertical tray height $h_{st}$ to the reference vertical tray height $h_{rt}$, the processor 36 will determine that the deviation between the sensed vertical tray height and the reference vertical tray height is zero or nearly zero. Accordingly, the sensed tray 28a is determined to be suitable for downstream processing.

In contrast to the straight sensed tray 28a of FIG. 6, FIG. 7 shows a sensed tray 28b that has at least one point of curvature or is bent relative to the conveyor line 26. When the sensed vertical tray height $h_{st}$ of the sensed tray 28b is sensed by the position sensing system and the processor 36 compares the sensed vertical tray height $h_{st}$ to the reference vertical tray height $h_{rt}$, the processor 36 will determine that the deviation between the sensed vertical tray height and the reference vertical tray height is greater than zero or another predetermined value at which the sensed tray 28b is determined to be unsuitable for downstream processing. If the sensed tray 28b is determined to be unsuitable for downstream processing, the positions of the extruded ice cream products arranged on the sensed tray 28b may not need to be further sensed.

As shown in FIG. 6, the sensed vertical product height $h_{sp}$ of the extruded ice cream product 30a is sensed by the position sensing system and the processor 36 compares the sensed vertical product height $h_{sp}$ to the reference vertical product height $h_{rp}$, the processor 36 will determine that the deviation between the sensed vertical tray height and the reference vertical tray height is zero or nearly zero. Accordingly, the extruded ice cream product 30a is determined to be suitable for downstream processing. In contrast, when the processor 36 compares the sensed vertical product height $h_{sp}$ of the extruded ice cream product 30b to the reference vertical product height $h_{rp}$, the processor 36 will determine that the deviation between the sensed vertical tray height and the reference vertical tray height is greater than zero, and the extruded ice cream product 30b may be deemed unsuitable for downstream processing. Additionally, when the processor 36 compares the sensed vertical product height $h_{sp}$ of the extruded ice cream product 30c to the reference vertical product height $h_{rp}$, the processor 36 will determine that the deviation between the sensed vertical tray height and the reference vertical tray height is less than zero, and the extruded ice cream product 30c may be deemed unsuitable for downstream processing.

The reference vertical product height $h_{rp}$ and the sensed vertical product heights $h_{sp}$ of the extruded ice cream products 30a, 30b, 30c may correspond to heights of the sticks 42 (as shown in FIGS. 2-4). The heights of the sticks 42 may be sensed by sensing the distance from the trays 28 to the sensor and from the sticks 42 to the sensor, such that the height of the sticks 42 relative to the trays 28 (or conveyor line 26) is known. The sticks 42 are located at a central axis 42a, 42b of the respective extruded ice cream products 30a, 30b, 30c. As shown in FIG. 7, due to the bent shape of the tray 28b, all of the sensed vertical product heights of the extruded ice cream products 30 will deviate from a reference vertical product height. The same sensors may be used to sense both the reference heights and the sensed heights of the trays and the extruded ice cream products.

As schematically shown in FIG. 8, in an exemplary application in which the extruded ice cream products 30c, 30d are ice cream sandwiches, the position sensing system senses a vertical product height of a bottom biscuit 60 and a top biscuit 62. The ice cream sandwich product 30c, 30d further includes an ice cream layer 64 that is interposed between the bottom biscuit 60 and the top biscuit 62. The vertical height of the bottom biscuit 60 may be sensed at an upstream location along the conveyor line 26 before the ice cream layer 64 and the top biscuit 62 are applied. The vertical height of the biscuits 60, 62 may be sensed using a distance from the sensor to the corresponding biscuit 60, 62. When the sensed vertical height of the bottom biscuit 60 is compared to a reference vertical height for the bottom biscuit 60 and the bottom biscuit 60 is deemed suitable for downstream processing, the ice cream sandwich product 30c, 30d is moved downstream along the conveyor 26 to at least one downstream station at which the ice cream layer 64 and subsequently, the top biscuit 62 are applied.

After the ice cream layer 64 and the top biscuit 62 are arranged on the properly aligned bottom biscuit 60, a different downstream sensor may then sense the vertical height of the top biscuit 62. If the deviation between the sensed vertical product height $h_{sp}$ of the top biscuit 62 and the reference vertical product height $h_{rp}$ of the top biscuit 62 is determined by the processor 36 to be zero, or less than a predetermined deviation, the entire ice cream sandwich product 30c is deemed suitable for downstream processing, e.g. packaging. Alternatively, for example, if the deviation between the sensed vertical product height $h_{sp}$ of the top biscuit 62 and the reference vertical product height $h_{rp}$ of the top biscuit 62 is greater than zero or a predetermined deviation, the entire ice cream sandwich product 30d may be deemed unsuitable for downstream processing.

FIGS. 9-12 are schematic drawings showing a top view of the conveyor line 26. FIGS. 9-12 pertain to the operation of the position sensing system 34 for detecting horizontal displacements of the tray 28 and the extruded ice cream products 30. The horizontal displacement sensing may occur simultaneously with the vertical displacement sensing. The position sensing system 34 first detects a reference horizontal position of a tray 28 and an extruded ice cream product 30 arranged on the tray 28. The reference horizontal positions are positions that enable the extruded ice cream product 30 to be suitable for downstream processing. The reference horizontal positions are stored in the memory 38 of the processor 36. The reference horizontal position of the tray 28 may correspond to a position of an edge 66, 68 of the tray 28, or to the position of edges 66, 68 that are perpendicular to each other. The reference horizontal positions are sensed by the sensor. For example, the edges of the tray 28 that extend along the width of the conveyor 26 are sensed by the sensor when the edges pass through an area being sensed by the sensor. The sensor may also scan along the width of the conveyor line 26 to sense the edges of the tray 28 that extend along the length of the conveyor 26.

The reference horizontal position of the extruded ice cream product 30 may correspond to a position of the stick 42 arranged at the central axis 42a of the extruded ice cream product 30. For example, the central portion of the stick 42 or the edges of the stick 42 that extend along the width of the conveyor 26 may be sensed by the sensor when the stick 42 passes through an area being sensed by the sensor. The sensor may also scan along the width of the conveyor line 26 to sense the edges of the stick 42 that extend along the length of the conveyor 26. After the reference horizontal positions are sensed and stored, the same or different sensors of the position sensing system 34 are used to sense the horizontal positions of the moving trays 28 and extruded ice cream products 30 and compare the sensed position data with the stored position data.

Figure 9:
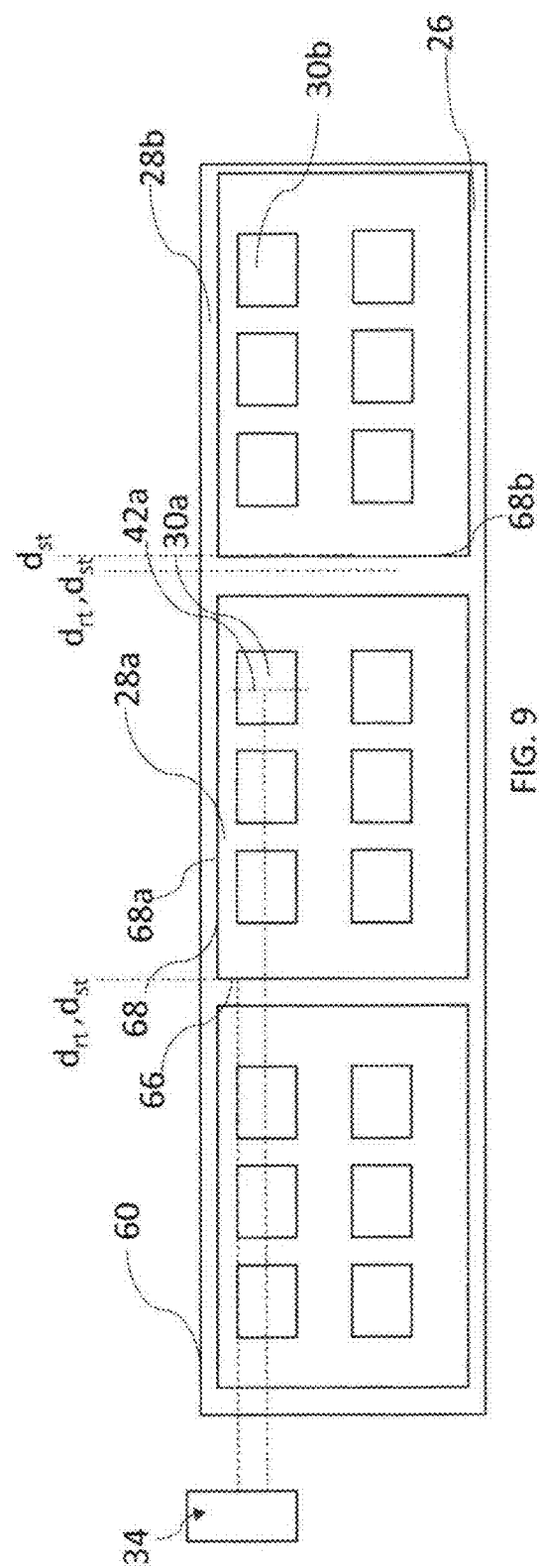
FIG. 9 is a schematic drawing showing a top view of the conveyor line having a misaligned tray.

As schematically shown in FIG. 9, the horizontal position of the edge 68 of the tray 28a is sensed by the sensor and the processor 36 determines that the deviation between the sensed horizontal tray position $d_{st}$ and the reference horizontal tray position $d_{rt}$ is zero or nearly zero, and the tray 28a and the ice cream products 30b is suitable for downstream processing. Other edges 68 of the sensed trays and the reference tray may also be compared by the processor for sensing a horizontal displacement. In contrast to the aligned tray 28a, the tray 28b is misaligned. The horizontal position of the edge 68b of the tray 28b is sensed by the sensor and the processor 36 determines that the deviation between the sensed horizontal tray position $d_{st}$ and the reference horizontal tray position $d_{rt}$ is greater than zero, and the tray 28b is unsuitable for downstream processing. If the deviation exceeds a predetermined deviation at which the extruded ice cream products 30b arranged on the tray 28b are also non-salvageable and unsuitable for downstream processing, the position sensing system may not further sense the horizontal product positions of the extruded ice cream products 30b.

As schematically shown in FIG. 10, the horizontal position of the extruded ice cream product 30a is sensed by the sensor. If the extruded ice cream product 30a is an ice cream bar having a stick, the horizontal position of the stick 42 arranged at the central axis 42a of the extruded ice cream product 30 is sensed. The sensed horizontal position data is received by the processor 36 that determines that the deviation between the sensed horizontal product position $d_{sp}$ and the reference horizontal product position $d_{rp}$ is zero or nearly zero, and the extruded ice cream product 30a is suitable for downstream processing. In contrast to the properly aligned extruded ice cream product 30a, the extruded ice cream product 30b is misaligned. The horizontal position of the extruded ice cream product 30b is sensed by the sensor and the processor 36 determines that the deviation between the sensed horizontal product position $d_{sp}$ and the reference horizontal product position $d_{rp}$ is greater than zero, and the extruded ice cream product 30b is unsuitable for downstream processing. The horizontal displacements of the trays and/or the extruded ice cream products may occur in a direction that is parallel or perpendicular to the direction of movement of the conveyor line 26.

In applications in which the extruded ice cream product 30 is an ice cream sandwich product 30c, as shown in FIG. 8, the reference horizontal position may correspond to a detected position of an edge 70 or a plurality of edges of the bottom biscuit and the top biscuit of the ice cream sandwich. The edges are sensed by the sensor as the corresponding biscuit passes through an area which is being sensed by the sensor. The horizontal position of the bottom biscuit 60 may be sensed at an upstream location along the conveyor line 26 before the ice cream layer 64 and the top biscuit 62 are applied. When the sensed horizontal position of the bottom biscuit 60 is compared to a reference horizontal position for the bottom biscuit 60 and the bottom biscuit 60 is deemed suitable for downstream processing, the ice cream sandwich product 30c, 30d is moved downstream along the conveyor 26 to at least one downstream station at which the ice cream layer 64 and subsequently, the top biscuit 62 are applied. The vertical position and the horizontal position of the bottom biscuit 60 may be sensed simultaneously.

After the ice cream layer 64 and the top biscuit 62 are arranged on the properly aligned bottom biscuit 60, a different downstream sensor may then sense the horizontal position of the top biscuit 62. If the deviation between the sensed horizontal product position of the top biscuit 62 and the reference horizontal product position of the top biscuit 62 is determined by the processor 36 to be zero, or less than a predetermined deviation, the entire ice cream sandwich product 30c is deemed suitable for downstream processing, e.g. packaging. Alternatively, for example, if the deviation between the sensed horizontal product position of the top biscuit 62a and the reference horizontal product position of the top biscuit 62a is greater than zero or a predetermined deviation, the entire ice cream sandwich product 30d may be deemed unsuitable for downstream processing, as schematically shown in FIG. 8.

With reference to FIGS. 11 and 12, the horizontal displacements of the trays and the extruded ice cream products may also occur angularly, or in a direction that is transverse to the parallel or perpendicular direction. As shown in FIG.

11, the tray 28b is angularly displaced relative to the reference tray 28a such that all of the ice cream products 30b are angularly displaced relative to the reference ice cream product 30a. The processor 36 may determine that the deviation between the sensed horizontal position of the edge 66b of the tray 28b and the reference horizontal position of the corresponding edge 66a of the tray 28a exceeds zero or a predetermined deviation at which the tray 28b is unsuitable for downstream processing. As shown in FIG. 12, the tray 28b is not angularly displaced, but one of the extruded ice cream products 30b arranged on the tray 28b is displaced relative to the reference extruded ice cream product 30a arranged on the tray 28a. The processor 36 may determine that the deviation between the sensed horizontal position of the central axis 42b of the tray 28b and the reference horizontal position of the corresponding central axis 42a of the tray 28a exceeds zero or a predetermined deviation at which the tray 28b is unsuitable for downstream processing. The vertical and horizontal displacements shown and described herein are merely exemplary, and many other displacements of the trays and extruded ice cream products may be sensed during operation of the production line.

Referring now to FIGS. 13 and 14, the processor 36 (shown in FIG. 1) is configured to provide an output 40 that is readable by an operator of the production line. FIGS. 13 and 14 are schematic drawings that show exemplary embodiments of images that may be viewed by the operator on an operator panel or graphical user interface (GUI) 72 that is in communication with the processor 36 for displaying data based on the data processed by the processor 36. The GUI 72 may display the sensed positions of the trays and the extruded ice cream products as graphics, actual values, setpoints, or alarm trigger level trends based on instructions provided to the GUI 72 by the processor 36. The GUI 72 may be configured to output a noise or alarm if the sensed positions are determined to be misaligned by the processor. The sensed positions may be displayed schematically, as shown in FIG. 13, and graphically, as shown in FIG. 14. The GUI 72 may also easily provide an indicator of the extruded ice cream products 30b that are unsuitable for downstream processing based on the deviations determined by the processor 36. For example, as shown in FIG. 13, the ice cream products 30a that are properly aligned in each lane 46 are indicated by a first color, such as green, and the ice cream products 30b that are misaligned are indicated by a second color, such as red. The operator can easily see which extruded ice cream products 30b will not be processed downstream and further processes may be taken to align the misaligned extruded ice cream products 30b before downstream processing to avoid discarding of the products.

As shown in FIG. 14, the GUI 72 further includes a screen or display that graphically shows the real-time sensed data of each lane 46 as processed and output from the processor 36 based on the sensed data received from the sensor. The GUI 72 has a moving display that corresponds to the sensed data along the moving conveyor line 26. The processor 36 generates a plurality of pulse-shaped signals 74 that correspond to the plurality of lanes 46, such that each lane 46 has an associated plurality of pulse-shaped signals 74. The pulse-shaped signals 74 are graphically displayed on the GUI 72. As shown on the display, the heights of the pulse-shaped signals 74 are proportional to the sensed heights relative to the conveyor line 26. Each plurality of pulse-shaped signals 74 has signals pertaining to the sensed vertical tray height $h_{st}$ relative to the conveyor line 26 and the sensed vertical product heights $h_{sp}$ of the ice cream products 30 relative to the trays 28 and the conveyor line 26. The graphed vertical heights correspond to the distance from the laser sensor to the object of the laser, which is either the tray 28, the ice cream product 30, or the conveyor line 26 between the trays 28. The graphed vertical heights are indirectly proportional to the distances between the sensed objects and the laser sensors. For example, the distances between the ice cream products 30 and the laser sensors are less than the distance between the trays 28 and the laser sensors, such that the sensed vertical product heights $h_{sp}$ are represented as a peak in the y-direction of the graphed plurality of pulse-shaped signals 74.

The horizontal positions of the trays 28 and the ice cream products 30 are graphically represented by changes in the plurality of pulse-shaped signals 74 in the x-direction. For example, the front edge 66 of the current tray 28 is represented by a sharp dip in the plurality of pulse-shaped signals. The sharp dip is representative of the laser sensor sensing the distance from the laser to the conveyor line 26 or to a point through the conveyor line 26 between the edges of adjacent trays 28. The front edges 76 of the ice cream products or sticks of the ice cream products, and the back edges 78 thereof are also graphically shown as sharp lines that are perpendicular to the signal line representing the tray 28. The front edges 76 and the back edges 78 are sensed as the ice cream product 30 moves through an area 80 at which the laser senses the edges. Accordingly, the widths of the ice cream products or of the sticks is known and the precise horizontal positions of the products and the sticks relative to the front edges 66 of the trays 28 can be readily identified by the graphical representation of the plurality of signals 74.

The GUI 72 is merely exemplary and it should be recognized that the positions of the trays 28 and the ice cream products 30, and other operating characteristics of the ice cream production line 20 (as shown in FIG. 1) may be output to the production line operator in any suitable format. Exemplary operating characteristics that may be output on the GUI 72 include the number of products being produced and sensed, the rate of production, the positions of the sensors, or the position of the ice cream cutting device. The output 40 may include visual indicators that represent corrections of the misaligned ice cream products 30 that are necessary to align the ice cream products 30 with the reference position. The GUI 72 may further enable the operator to select a manual or automatic correction mode. If a manual mode is selected, the operator can manually correct the position of the ice cream products 30 based on the graphically shown product positions and figures of the GUI 72. The reference positions and the actual positions of the ice cream products 30 are displayed on the GUI 72 by the processor 36. If an automatic mode is selected, the processor 36 will automatically correct the positions of the ice cream products 30 and maintain the ice cream products 30 in the reference positions relative to the trays 28. The automatic corrections may be performed by any suitable controller that is in communication with the processor 36 and configured to engage the ice cream products 30.

While the invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

The invention claimed is:

1. A method of producing extruded ice cream products, the method comprising:
   providing a plurality of extruded ice cream products in an ordered arrangement on a plurality of trays;
   arranging the plurality of trays for movement along a conveyor line, the plurality of trays and the plurality of extruded ice cream products being arranged thereon for downstream processing;
   sensing at least one of a vertical product height or a horizontal product position of the plurality of extruded ice cream products arranged on the plurality of trays using at least one sensor;
   analyzing the sensed at least one of the vertical product height or the horizontal product position of the plurality of extruded ice cream products using a processor to determine suitability for downstream processing, and
   comparing the sensed at least one of the vertical product height or the horizontal product position of the plurality of extruded ice cream products to a reference vertical product height or a reference horizontal product position of the plurality of extruded ice cream products, respectively, using the processor to calculate a vertical product height deviation or a horizontal product position deviation, wherein the plurality of extruded ice cream products are suitable for downstream processing when the calculated deviation is less than a predetermined deviation.

2. The method according to claim 1 further comprising using at least one laser sensor or a machine vision camera arranged over at least one lane of the plurality of extruded ice cream products, wherein the at least one lane extends along the conveyor line in a direction of movement of the conveyor line.

3. The method according to claim 2 further comprising using a plurality of aligned laser sensors, wherein each laser sensor corresponds to one of a plurality of lanes.

4. The method according to claim 2 further comprising using a single laser sensor and a plurality of directing optical devices that are each in communication between the single laser sensor and a corresponding one of a plurality of lanes.

5. The method according to claim 1 further comprising outputting the sensed at least one of the vertical product height or the horizontal product position of the plurality of extruded ice cream products as a plurality of pulse-shaped signals having a shape that is proportional to the sensed vertical product height or horizontal product position.

6. The method according to claim 1 further comprising continuously sensing the at least one of the vertical product height or the horizontal product position of the plurality of extruded ice cream products.

7. The method according to claim 1 further comprising sensing the at least one of a vertical product height or the horizontal product position by sensing a vertical position or horizontal position of sticks that are centrally arranged in the plurality of extruded ice cream products.

8. The method according to claim 1 further comprising:
   sensing at least one of a vertical product height or a horizontal product position of bottom biscuits of the plurality of extruded ice cream products using the at least one sensor; and
   sensing at least one of a vertical product height or a horizontal product position of top biscuits of the plurality of extruded ice cream products using the at least one sensor.

9. The method according to claim 1 further comprising:
   sensing at least one of a vertical tray height or a horizontal tray position of the plurality of trays using the at least one sensor; and
   analyzing the sensed at least one of the vertical tray height or the horizontal tray position of the plurality of trays using the processor to determine suitability for downstream processing.

10. The method according to claim 9 further comprising:
    sensing the horizontal tray position of edges of the plurality of trays using the at least one sensor; and
    sensing the horizontal product position of the plurality of extruded ice cream products relative to the edges of the plurality of trays using the at least one sensor.

11. The method according to claim 9 further comprising comparing the sensed at least one of the vertical tray height or the horizontal tray position of the plurality of extruded ice cream products to a reference vertical tray height or a reference horizontal tray position of the plurality of trays, respectively, using the processor to calculate a vertical product tray deviation or a horizontal tray deviation, wherein the plurality of extruded ice cream products arranged on the plurality of trays are suitable for downstream processing when the calculated deviation is less than a predetermined deviation.

12. A system for producing extruded ice cream products, the system comprising:
    a plurality of extruded ice cream products having an ordered arrangement on a plurality of trays that are arranged for movement along a conveyor line, wherein the plurality of trays and the plurality of extruded ice cream products are arranged on the conveyor line for downstream processing;
    at least one sensor that is configured to sense at least one of a vertical product height or a horizontal product position of the plurality of extruded ice cream products arranged on the plurality of trays; and
    a processor that is configured to:
    analyze the sensed at least one of the vertical product height or the horizontal product position of the plurality of extruded ice cream products to determine suitability for downstream processing,
    compare the sensed at least one of the vertical product height or the horizontal product position of the plurality of extruded ice cream products to a reference vertical product height or a reference horizontal product position of the plurality of extruded ice cream products, respectively, and
    calculate a vertical product height deviation or a horizontal product position deviation, wherein the processor determines that the plurality of extruded ice cream products are suitable for downstream processing when the calculated deviation is less than a predetermined deviation.

13. The system according to claim 12,
    wherein the at least one sensor is configured to sense at least one of a vertical tray height or a horizontal tray position of the plurality of trays, and the horizontal product position of the plurality of extruded ice cream products relative to the plurality of trays; and
    wherein the processor is configured to analyze the sensed at least one of the vertical tray height or the horizontal tray position of the plurality of trays to determine suitability for downstream processing.

14. The system according to claim 12,
    wherein the plurality of extruded ice cream products have sticks that are centrally arranged in the extruded ice cream products and the vertical product height or the horizontal product position corresponds to a vertical height or a horizontal position of the sticks, or wherein the plurality of extruded ice cream products have a bottom biscuit, a top biscuit, and an ice cream layer extruded therebetween, and the vertical product height or the horizontal product position corresponds to a vertical height or a horizontal position of at least one of the bottom biscuit and the top biscuit.

* * * * *